United States Patent
Coleman

(10) Patent No.: US 7,257,284 B2
(45) Date of Patent: Aug. 14, 2007

(54) OPTICAL SWITCHING USING LIGHT BULLETS

(75) Inventor: Brian R. Coleman, 101 Jefferson Dr., Menlo Park, CA (US) 94026

(73) Assignee: Brian R. Coleman, San Francisco, CA (US)

( * ) Notice: Subject to any disclaimer, the term of this patent is extended or adjusted under 35 U.S.C. 154(b) by 0 days.

(21) Appl. No.: 11/525,470

(22) Filed: Sep. 22, 2006

(65) Prior Publication Data

US 2007/0014511 A1    Jan. 18, 2007

Related U.S. Application Data

(62) Division of application No. 10/828,928, filed on Apr. 20, 2004, now Pat. No. 7,149,379.

(60) Provisional application No. 60/464,593, filed on Apr. 21, 2003.

(51) Int. Cl.
*G02B 6/26* (2006.01)
(52) U.S. Cl. ............................. 385/16; 385/5
(58) Field of Classification Search .................. 385/16, 385/5

See application file for complete search history.

(56) References Cited

U.S. PATENT DOCUMENTS

| 5,157,744 | A  | * | 10/1992 | Korotky        | 385/2   |
| 5,963,683 | A  | * | 10/1999 | Goorjian       | 385/16  |
| 6,173,096 | B1 | * | 1/2001  | Bagley et al.  | 385/50  |
| 6,178,275 | B1 | * | 1/2001  | Nerses et al.  | 385/14  |
| 6,580,859 | B1 | * | 6/2003  | Maier          | 385/122 |

* cited by examiner

*Primary Examiner*—Ellen E. Kim
(74) *Attorney, Agent, or Firm*—Perkins Coie LLP

(57) ABSTRACT

A method and apparatus for optical switching using light bullets is presented. In one embodiment, the invention is a switch. The switch is a multi-channel, optical switch to use light bullets as optical pulses. The switch includes a waveguide of a first material. The switch also includes a plurality of channels extending from the waveguide. Each channel of the plurality of channels is to provide an optical path suitable for transmission of the light bullets. Each channel is formed of a material other than the first material. A first subset of the light bullets are to propagate into a predetermined channel of the plurality of channels responsive to interaction with a second subset of the light bullets.

11 Claims, 7 Drawing Sheets

OPTICAL SWITCHING USING LIGHT BULLETS

CROSS REFERENCE TO RELATED APPLICATIONS

This application is a divisional of U.S. Utility patent application Ser. No. 10/828,928, filed Apr. 20, 2004, is now U.S. Pat. No. 7,149,379, which in turns claims the benefit of U.S. Provisional Patent Application No. 60/464,593 filed Apr. 21, 2003, both of which are hereby incorporated by reference in their entirety.

FIELD

The present invention generally relates to optical data transmission and more specifically relates to all-optical switching of data through a waveguide using solitons (light bullets).

BACKGROUND

Switching is an essential operation in communication networks. Switching is also a basic operation in digital computers and signal processing systems. The current rapid development of high-data-rate fiber-optic communications systems has created a need for high capacity repeaters and terminal systems for processing optical signals, and therefore, a need for high-speed photonic switches. Similarly, the potential for optical computing can optimally be realized if large arrays of fast photonic gates, switches, and memory elements are developed. Currently, much switching is done using an incoming datastream transmitted by fiber optics, a component to translate the data from light to electrical signals, an electrical switch, a component to translate the data from electrical signals to light, and an outgoing fiber optic cable.

When a pulse of light travels in a linear dispersive medium its length increases due to group-velocity dispersion. Depending on the intensity of the pulse and the material properties of the medium, nonlinear effects on the pulse shape, called self-phase modulation, can also be significant. Nonlinear effects are characterized by a nonlinear relationship between the polarization density and the electric field; an example is the Kerr effect. The interplay between self-phase modulation and group-velocity dispersion can therefore result in an overall pulse spreading or pulse compression, depending on the magnitudes and signs of these two effects.

Under certain conditions, an optical pulse of prescribed shape and intensity can travel in a nonlinear dispersive medium without altering its shape, as if it were traveling in an ideal linear non-dispersive medium. This occurs when the group-velocity dispersion fully compensates for the effect of self-phase modulation. Such pulse-like stationary waves are called solitary waves. Optical solitons are special solitary waves that are orthogonal, in the sense that when two of these waves cross one another in the medium, their intensity profiles are not altered, and only phase shifts are imparted as a result of the interaction, so that each wave continues to travel as an independent entity.

At a certain level of intensity and for certain pulse profiles, the effects of self-phase modulation and group-velocity dispersion are balanced so that a stable pulse, the soliton, travels without spread. The mathematical analysis of this phenomenon has so far been based on approximate solutions of Maxwell's nonlinear wave equations.

As used herein, the term soliton refers to generic solutions describing pulses that propagate without substantial change, and may be temporal or spatial. Spatial solitons are monochromatic, self-guided beams that are localized spatially in the transverse plane. They travel in a nonlinear medium without altering their spatial distribution, as a result of the balance between diffraction and self-phase modulation. Spatial solitons are the transverse analogs of temporal or longitudinal solitons. Optical pulses including solitons, may be used for photonic switching and computing.

As used herein, a switch is a device that establishes and releases connections among transmission paths, such as in communication or signal-processing systems. A control unit processes the commands for connections and sends a control signal to operate the switch in the desired manner.

A switch is generally characterized by the following parameters:

Size: number of input and output lines.

Directions: whether data can be transferred in one or more directions.

Switching time: time necessary for the switch to be reconfigured from one state to another.

Propagation delay time: time taken by the signal to cross the switch.

Throughput: maximum data rate that can flow through the switch when it is connected.

Switching energy: energy needed to activate and deactivate the switch.

Power dissipation: energy dissipated per second in the process of switching.

Insertion loss: drop in the signal power introduced by the connection.

Crosstalk: undesired power leakage to other lines.

Optical signals may be switched by the use of electrical, acoustic, and magnetic switches. For instance, in electro-optic switches, the optical signals are converted into electrical signals using photodetectors, switched electronically, and then converted back into light using LEDs or lasers. These optical/electrical conversions introduce unnecessary time delays and power loss, in addition to the loss of the optical phase caused by the process of detection. Therefore, direct optical switching is clearly preferable to non-optical switching.

In an all-optical (or opto-optic) switch, light controls light with the help of a nonlinear optical material. Nonlinear optical effects may be direct or indirect, and may be used to make all-optical switching devices. All-optical switching devices have the capability of switching at much higher rates than non-optical switching devices.

Currently, there exist a number of all-optical switching devices, including the birefringent-fiber polarization switch, the optical-fiber Kerr gate, the two-core-fiber nonlinear directional coupler, the birefringent single-core-fiber, the nonlinear fiber-loop mirror, the soliton dragging logic gate, the bistable nonlinear optical switching device, the spatial soliton beam switch in a planar waveguide, the nonlinear polarization switch in a semiconductor waveguide including a multiquantum well waveguide, the semiconductor interferometer switch, the nonlinear Bragg semiconductor waveguide switch, and the bistable optical switch.

Spatial and temporal solitons have been produced in the laboratory and used for all-optical switching. The power requirements for an optical soliton decrease as the strength of the nonlinear index of refraction increases. Therefore, the use of highly nonlinear glasses is preferable because they have larger nonlinear indices of refraction, and will significantly reduce the power requirements for the solitons.

In a nonlinear optical material, temporal soliton pulses are confined in the direction transverse to propagation by propagating in a fiber. A more maneuverable temporal soliton would be able to move in a transverse direction, such as in a planar slab waveguide. Such special types of solitons are referred to as "light bullets". Light bullets are essentially pulses of light which, when propagating in a nonlinear material, maintain their shapes under the effect of diffraction (spreading transverse to the direction of propagation), dispersion (spreading in the direction of propagation), and nonlinearity.

However, light bullets have so far only been studied theoretically, and have not yet been produced in a laboratory. Additionally, until recently, light bullets were believed to be unstable, unless the material is saturable. The analysis for this conclusion is based on the nonlinear Schrodinger equations, which, in turn, are an approximation of Maxwell's equations. In essence, the analysis determined that light pulses will collapse. However, this analysis resorted to an approximation which neglects higher order terms in resolving Maxwell's equations, and did not take into account factors that limit the collapse, such as higher order dispersion.

A computer simulation that uses the exact Maxwell's equations without any approximation shows that light bullets are in fact stable, and that there is no need for saturating the material to obtain stability. This simulation also indicates that light bullets can deflect each others' travel paths upon collision. These light bullets will be on the order of 25 to 250 femtoseconds in duration, where one femtosecond is $10^{-15}$ seconds.

Most of the existing or previously proposed all-optical switching devices do not use or propose the use of light bullets in planar slab waveguides made from commercially available nonlinear optical glass. Prior devices often are relatively large physically or use relatively large optical pulses, as compared to the proposed device. In some of those prior devices, such as the two-core-fiber nonlinear directional coupler, the light pulses interact relatively weakly through evanescent waves. The spatial soliton devices suffer from the effects of dispersion on the pulses and the temporal soliton devices are confined to fibers and hence do not have the maneuverability of pulses in waveguides. Prior devices often do not use light bullets, which are extremely small, maneuverable and do not degrade on propagation, (i.e., are self-sustainable).

FIG. 1 illustrates a prior art embodiment of an optical switch. In particular, FIG. 1 illustrates a four-channel all-optical switching device 10. The switch 10 includes a single planar, rectangularly shaped slab waveguide 12 and a plurality of channels 14, 15, 16 and 17 that integrally depend from the waveguide 12 to provide input and output paths for the switch 10. The switch 10 may be made from highly nonlinear optical materials, including highly nonlinear optical glasses, semiconductor crystals and/or multiple quantum well semiconductor materials, and uses stable light bullets 20, 21 as optical pulses to switch each others' direction of propagation.

In this embodiment, the waveguide 12 is rectangularly shaped, and has a length "L" of about 1 cm, a width "W" of about 950 μm, and a thickness of about 2 μm. Selected candidate materials for use in the switch 10 include lead-bismuth-gallate glass, and named RN glass. The nonlinear effect is due to the product of the nonlinear index of refraction ($n_2$) times the intensity of the optical pulse. Therefore, as the nonlinear index of refraction ($n_2$) is increased, the power requirement can be decreased, since the power requirement is inversely proportional to the nonlinear index of refraction ($n_2$).

Some semiconductor crystals, such as GaAs and InP, have larger nonlinear indices of refraction than nonlinear glass, and as such, they may be selected as appropriate materials for the optical switch 10. Other semiconductor crystals, such as the wide-bandgap material GaN, will allow shorter operating optical wavelengths than narrower bandgap materials, such as GaAs and InP, and as such, they may be selected as appropriate materials for the optical switch 10.

Semiconductor materials have wavelength regions, within the infrared wavelength region in which they are optically transparent. These regions depend on the individual semiconductor material. Some of these materials are III-V binary semiconductors, and other combinations of elements from groups III and V can form ternary and quaternary semiconductors. Two exemplary materials, i.e., Gallium Arsenide (GaAs) and Indium Phosphide (InP) have low losses from absorption in the transparency region.

Referring back to FIG. 1, the four channels 14 through 17 are comprised of two generally identical, elongated central channels 14, 17 that are oppositely disposed relative to the waveguide 12. The axes of symmetry of these two central channels 14, 17 coincide. Each of the central channels 14, 17 has a width "d" of about 25 μm. The other two side or lateral channels 15, 16 are disposed on either side of the waveguide 12, in a generally symmetrical relation relative to the geometrical center of the waveguide 12. Each of the exit channels 15, 16 has a width "c" of about 20 μm, and is separated from its respective adjacent central channel 14, 17, by a distance "s" of about 15 μm.

In use, a sequence of counter-propagating light bullets 20, 21 are selectively injected through the central channels 14, 17, into the waveguide 12, so that they change each others' direction of propagation, thus achieving all-optical switching. A light bullet 20 that is sent into the waveguide 12 from the central channel 14 will propagate through the waveguide 12 along a straight travel path, and will exit into the central channel 17. When two counter-propagating light bullets 20, 21 are introduced into the waveguide 12 from the central channels 14 and 17, and are axially displaced relative to each other, in the transverse direction, by the spatial width $a_0$ of a single light bullet, these light bullets 20, 21 will collide and will deflect each other.

This interaction is an attractive one in that the light bullets 20, 21 attract each other as they pass. The result will be that the light bullets 20, 21 entering from the central channels 14 and 17, will exit into the lateral channels 16 and 15, respectively. The interaction between the light bullets 20, 21 forms the mechanism for the optical switch 10.

In the embodiment illustrated in FIG. 1, the light bullet 20 from the central channel 14 is displaced downward with respect to the light bullet 21 from the central channel 17, causing the deflection angle "b" to be approximately ½°(one half of one degree). The deflection angle is determined by the light bullet power level, the material parameters and the shape of the light bullet pulse. For instance, if the light bullet power intensity were increased, the deflection angle would increase accordingly. The deflection angle determines the length "L" of the waveguide 12.

The light bullets 20, 21 used in the switch 10 have a temporal duration of approximately 100 femtoseconds. For RN glass, the proposed wavelength of the optical carrier is about 3.5 μm, which is in the infrared wavelength range. Other proposed wavelengths of 7.85 microns for GaAs, 6.35 microns for InP, and 2.97 microns for GaN may also be used.

Although semiconductor crystals allow a decrease in the power required for the proposed optical switch 10 relative to the power requirement for RN glass, the use of quantum well semiconductor materials will allow a further significant reduction in the power requirement. The third order nonlinear susceptibility in semiconductors has been greatly increased by the use of multiple quantum well (MQW) structures in the semiconductor materials. The MQW structures that utilize AlInAs/GaInAs materials showed increases in nonlinear susceptibilities of five to six orders of magnitude greater than those associated with bound electrons in InAs and GaAs at comparable wavelengths. The MQW structures that used GaAs/AlGaAs showed comparable increases of over four orders of magnitude. These measurements were made at wavelengths of about 10.5 microns. It should be understood that various other MQW materials may be used.

InGaAs/InP may exhibit relatively lower absorptive losses. Also, GaN/AlGaN MQW materials are another candidate material and would be able to operate at relatively shorter wavelengths. Since the power requirement for a light bullet is inversely proportional to the nonlinear susceptibility of the material the power requirement for the MQW structure may range significantly lower then the power requirements for previously described materials. Alternative nonlinear photonic glasses may be used to generate light bullets with the desired characteristic properties. Alternative semicondutor materials for use in the switch 10 to generate light bullets with the desired properties may also be used.

At a predetermined intensity, it is possible to select a group velocity dispersion of the material, which, when considered with other parameters, determines the width and the power level of the light. For each material a wavelength must be determined in order to obtain a reasonable amount of negative group velocity dispersion. This value of group velocity dispersion is used together with the nonlinear index of refraction and intensity to determine the length and width of a pulse that will form a light bullet. Also, the intensity is chosen to satisfy two requirements. First, a reasonable power level that is attainable with available power sources, such as laser equipment; and second, the intensity is such that it is sufficient to produce a strong interaction between colliding light bullets.

FIG. 1 illustrates a modification to the switch 10, in which the lateral channels 15A and 16A (shown in dashed lines) are so positioned as to form an angle "b" (i.e., equal to the deflection angle) with respect to the central axis of the waveguide 12. In such a design, the deflected light bullets 20, 21 exit the waveguide 12 through the exit lateral channels 16A and 15A, parallel to the sides of these channels.

The embodiment of FIG. 1 is known using counter-propagating light bullets traveling through channels and a waveguide all formed of the same material. Moreover, how to control the embodiment of FIG. 1 is not apparent. Therefore, there is still a great and unsatisfied need for a practical realization of an ultra-fast all-optical photonic switching device utilizing light bullets. The material used to build this device should be readily available and relatively inexpensive to manufacture, and it should further exhibit characteristic parameters that are adequate for the production and/or use of light bullets.

SUMMARY

A method and apparatus for optical switching using light bullets is presented. In one embodiment, the invention is a switch. The switch is a multi-channel, optical switch to use light bullets as optical pulses. The switch includes a waveguide of a first material. The switch also includes a plurality of channels extending from the waveguide. Each channel of the plurality of channels is to provide an optical path suitable for transmission of the light bullets. Each channel is formed of a material other than the first material. A first subset of the light bullets are to propagate into a predetermined channel of the plurality of channels responsive to interaction with a second subset of the light bullets.

In an alternate embodiment, the invention is a method of switching optical data. The method includes receiving a light bullet in a first optical channel. The first optical channel is formed of a first material. The method also includes injecting the light bullet into a waveguide. The waveguide is formed of a second material different from the first material. The method further includes directing the light bullet within the waveguide responsive to a guiding light bullet. The method also includes receiving the light bullet in a predetermined second optical channel.

In another alternate embodiment, the invention is a method of making an optical switch for use with data embodied as light bullets. The method includes providing a waveguide of a first material. The method also includes connecting to the waveguide a plurality of channels of a second material. The channels are to provide optical paths for light bullets. The second material is different from the first material. The method further includes connecting to the waveguide a plurality of light source channels. The light source channels are to provide optical paths for light bullets. The method also includes coupling a light source to the plurality of light source channels.

In yet another alternate embodiment, the invention is an apparatus. The apparatus includes first means for transmitting light bullets, the first means composed of a first material. The apparatus also includes means for switching light bullets. The means for switching is composed of a second material. The second material is different from the first material. The means for switching is also for directing the light bullets through interactions between light bullets and for receiving light bullets from the first means for transmitting. The apparatus further includes a second means for transmitting light bullets. The second means for transmitting is for receiving a light bullet from the means for switching.

In still another alternate embodiment, the invention is a router. The router includes a plurality of input ports and a plurality of output ports. The router also includes a switching fabric. The switching fabric is coupled to the plurality of input ports. The switching fabric is also coupled to the plurality of output ports. The switching fabric includes a plurality of interconnected multi-channel, optical switches, each of the optical switches to use light bullets as optical pulses. Each of the optical switches includes a waveguide of a first material. Each of the optical switches includes a plurality of channels extending from the waveguide. Each of the channels is formed of a material other than the first material. Each of the channels is to provide an optical path suitable for transmission of the light bullets. A first subset of the light bullets are to propagate into a predetermined channel of the plurality of channels responsive to interaction with a second subset of the light bullets. The optical switches of the plurality of optical switches are coupled together through the channels of the plurality of channels of each optical switch.

In yet another embodiment, the invention is a switching fabric. The switching fabric is to switch light bullets between a set of input ports and a set of output ports. The switching fabric includes a plurality of interconnected multi-channel, optical switches, each of the optical switches to use light bullets as optical pulses. Each of the optical switches includes a waveguide of a first material. Each of the optical switches also includes a plurality of channels extending from the waveguide, each channel of the plurality of channels to provide an optical path suitable for transmission of the light bullets. Each channel is formed of a material other than the first material. A first subset of the light bullets are to propagate into a predetermined channel of the plurality of channels responsive to interaction with a second subset of the light bullets. The optical switches of the plurality of optical switches are coupled together through the channels of the plurality of channels of each optical switch.

BRIEF DESCRIPTION OF THE DRAWINGS

The present invention is illustrated in several exemplary embodiments within the figures in which like reference numbers indicate similar or the same components. The figures are to be understood as exemplary and not limiting on the spirit and scope of the present invention.

DETAILED DESCRIPTION

Figure 1:
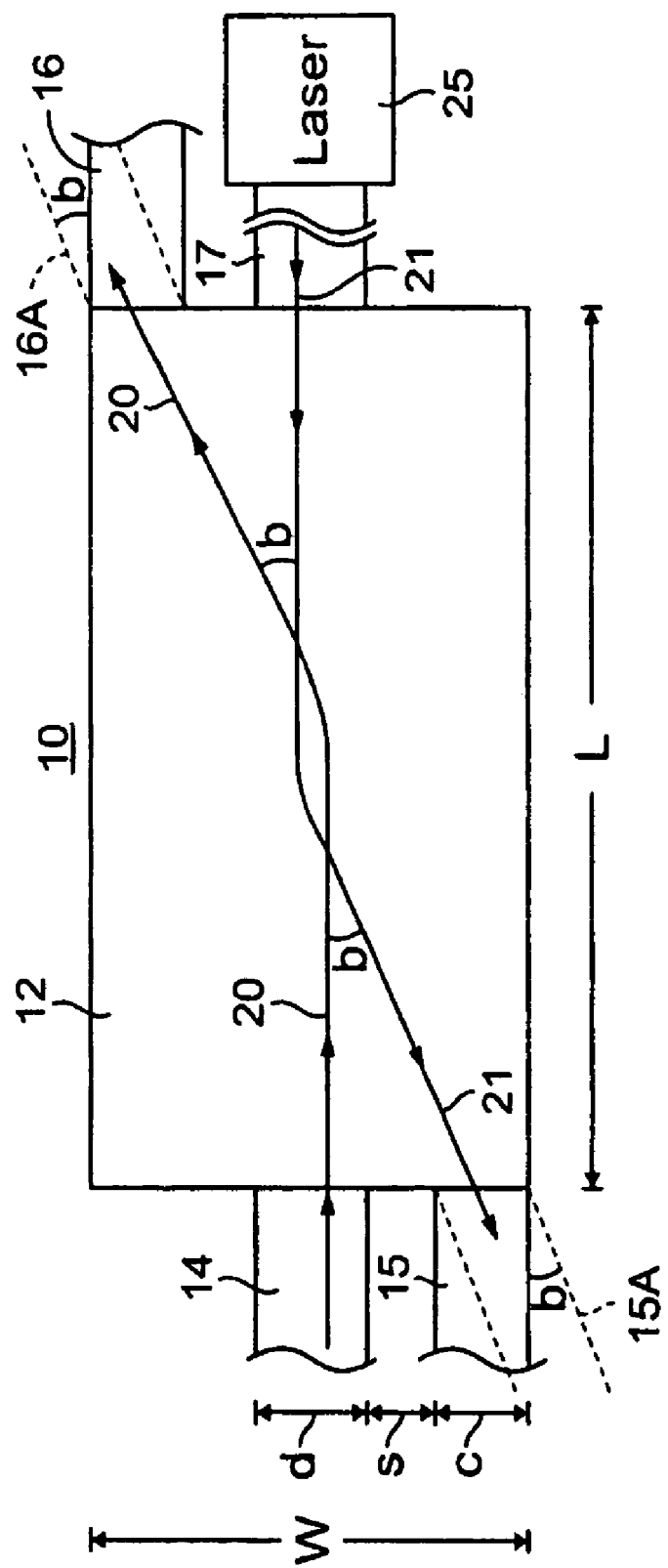
FIG. 1 illustrates a prior art embodiment of an optical switch.

A variety of methods and apparatuses for optical switching using light bullets are presented. The method and apparatus is illustrated by way of example and not limitation in the text and accompanying figures. The embodiments described and depicted should thus be regarded as illustrative rather than restrictive of the present invention.

The method and apparatus for optical switching using light bullets generally involves receiving light data (light bullets), switching or steering the light bullets, and transmitting the light bullets onward. It is implemented using co-propagating light bullets in some embodiments. Furthermore, it is implemented using materials which are necessary for proper functioning, without requiring the use of materials that may greatly exceed the specifications necessary for proper functioning. For example, a waveguide of a first material may be needed for purposes of preserving the defining characteristics of a light bullet at the time of switching. However, the channels connected to the waveguide may be of a second material, as the channels need not provide the same level of preservation of the light bullets during transit from or to the waveguide.

In one embodiment, the invention is a switch. The switch is a multi-channel, optical switch to use light bullets as optical pulses. The switch includes a waveguide of a first material. The switch also includes a plurality of channels extending from the waveguide. Each channel of the plurality of channels is to provide an optical path suitable for transmission of the light bullets. Each channel is formed of a material other than the first material. A first subset of the light bullets are to propagate into a predetermined channel of the plurality of channels responsive to interaction with a second subset of the light bullets.

In an alternate embodiment, the invention is a method of switching optical data. The method includes receiving a light bullet in a first optical channel. The first optical channel is formed of a first material. The method also includes injecting the light bullet into a waveguide. The waveguide is formed of a second material different from the first material. The method further includes directing the light bullet within the waveguide responsive to a guiding light bullet. The method also includes receiving the light bullet in a predetermined second optical channel.

In another alternate embodiment, the invention is a method of making an optical switch for use with data embodied as light bullets. The method includes providing a waveguide of a first material. The method also includes connecting to the waveguide a plurality of channels of a second material. The channels are to provide optical paths for light bullets. The second material is different from the first material. The method further includes connecting to the waveguide a plurality of light source channels. The light source channels are to provide optical paths for light bullets. The method also includes coupling a light source to the plurality of light source channels.

In yet another alternate embodiment, the invention is an apparatus. The apparatus includes first means for transmitting light bullets, the first means composed of a first material. The apparatus also includes means for switching light bullets. The means for switching is composed of a second material. The second material is different from the first material. The means for switching is also for directing the light bullets through interactions between light bullets and for receiving light bullets from the first means for transmitting. The apparatus further includes a second means for transmitting light bullets. The second means for transmitting is for receiving a light bullet from the means for switching.

In still another alternate embodiment, the invention is a router. The router includes a plurality of input ports and a plurality of output ports. The router also includes a switching fabric. The switching fabric is coupled to the plurality of input ports. The switching fabric is also coupled to the plurality of output ports. The switching fabric includes a plurality of interconnected multi-channel, optical switches, each of the optical switches to use light bullets as optical pulses. Each of the optical switches includes a waveguide of a first material. Each of the optical switches includes a plurality of channels extending from the waveguide. Each of the channels is formed of a material other than the first material. Each of the channels is to provide an optical path suitable for transmission of the light bullets. A first subset of the light bullets are to propagate into a predetermined channel of the plurality of channels responsive to interaction with a second subset of the light bullets. The optical switches of the plurality of optical switches are coupled together through the channels of the plurality of channels of each optical switch.

In yet another embodiment, the invention is a switching fabric. The switching fabric is to switch light bullets between a set of input ports and a set of output ports. The switching fabric includes a plurality of interconnected multi-channel, optical switches, each of the optical switches to use light bullets as optical pulses. Each of the optical switches includes a waveguide of a first material. Each of the optical switches also includes a plurality of channels extending from the waveguide, each channel of the plurality of channels to provide an optical path suitable for transmission of the light bullets. Each channel is formed of a material other than the first material. A first subset of the light bullets are to propagate into a predetermined channel of the plurality of channels responsive to interaction with a second subset of the light bullets. The optical switches of the plurality of optical switches are coupled together through the channels of the plurality of channels of each optical switch.

Figure 2:
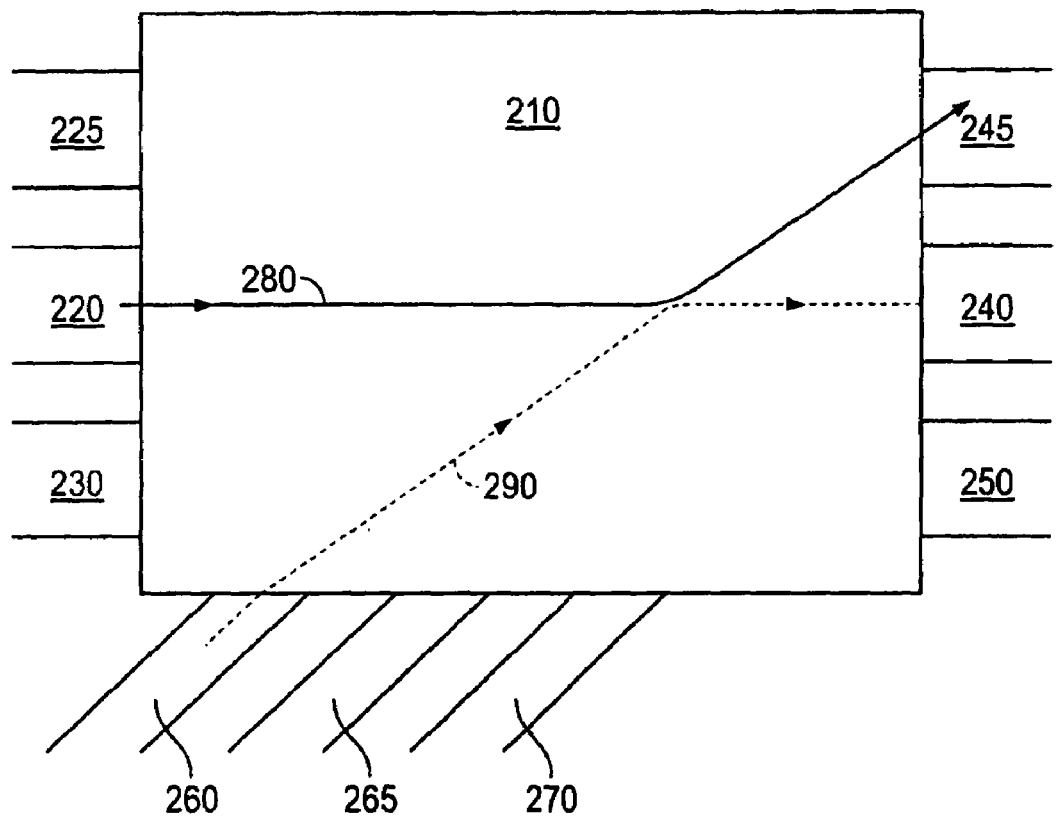
FIG. 2 illustrates an embodiment of an optical switch.

The invention may be implemented, in some embodiments, as an optical switch. FIG. 2 illustrates an embodiment of an optical switch 200. The embodiment illustrated makes use of a waveguide suitable for interaction between two well-defined light bullets and optical channels suitable for transmission of light bullets. Waveguide 210 is formed of a first material, such as GaAs for example. Extending from waveguide 210 on a first side are channels 220, 225 and 230, each of which provide a path for a light bullet. Extending from a second side of waveguide 210 are channels 240, 245 and 250. In the embodiment illustrated, channel 220 is situated directly across waveguide 210 from channel 240. Similarly, channel 225 is situated directly across waveguide 210 from channel 245 and channel 230 is situated directly across waveguide 210 from channel 250. The channels 220, 225, 230, 240, 245, and 250 are formed of a different material from the first material. In some embodiments, all channels are formed of the same material. In alternate embodiments, individual channels may be formed of various different materials.

As illustrated, light bullet 280 is inserted into waveguide 210 from channel 220 on a path aimed at channel 240. However, extending from a third side of waveguide 210 are light source channels 260, 265 and 270. As illustrated, a guide light bullet 290 (a light bullet intended to guide another light bullet) is inserted into waveguide 210 from light source channel 260. Within waveguide 210, light bullet 280 and light bullet 290 interact in a predetermined manner, causing light bullet 280 to deviate to channel 245 and causing light bullet 290 to deviate to channel 240. Effectively, light bullet 280 has been switched from channel 240 to channel 245. This may also be viewed as switching from channel 220 to channel 245. Note that light bullets 280 and 290 co-propagate, and that the interaction between light bullets (such as 280 and 290) is in part a function of the intensity or energy of the interacting light bullets. Additionally, note that in some embodiments, channels for light bullets (such as 220, 225, 230, 240, 245, and 250 for example) include devices or components suitable for transforming light from an optical fiber into a light bullet, for performing the reverse transformation, or for performing both types of transformations.

Figure 3:
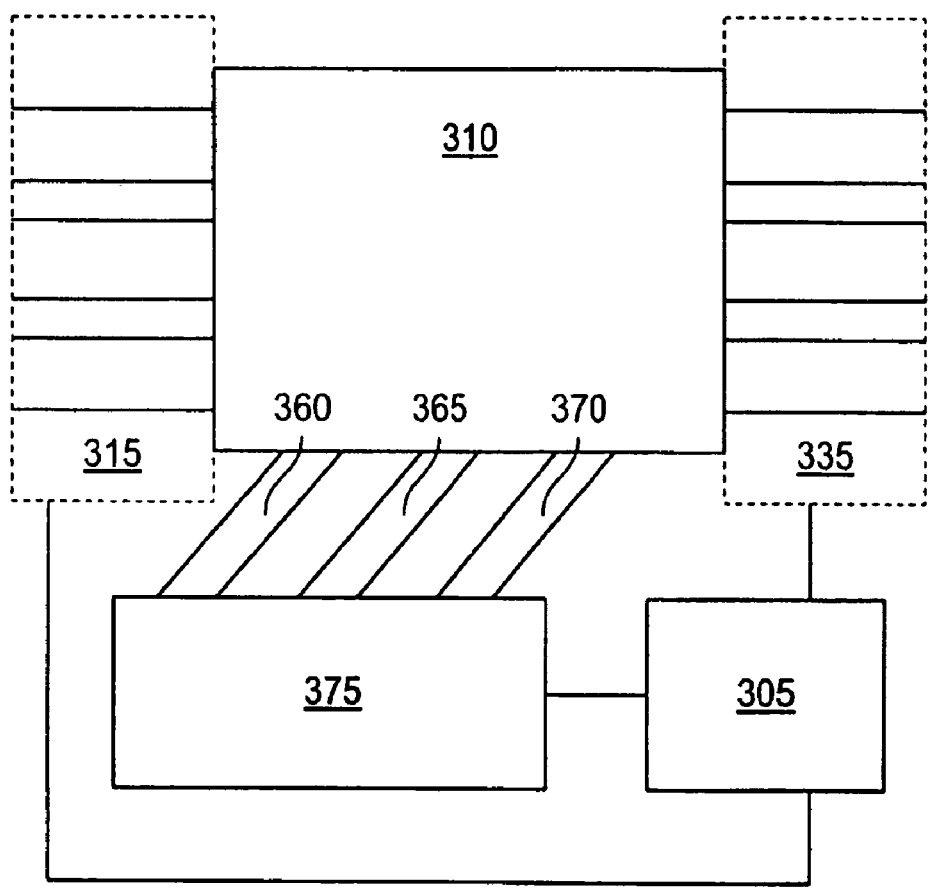
FIG. 3 illustrates an alternate embodiment of an optical switch.

Alternatively, in some embodiments, a light source and internal control block will be included. Note that external control of a light source may also be suitable, as would be appropriate for the embodiment illustrated in FIG. 2. FIG. 3 illustrates an alternate embodiment of an optical switch. The embodiment illustrated makes use of an internal control module to allow for operation with relatively little interaction with an external controlling system. Waveguide 310 is connected to a first bank of optical channels 315 on a first side and to a second bank of optical channels 335 on a second side. On a third side of waveguide 310 are connected three light source channels 360, 365, and 370. Connected to light source channels 360, 365 and 370 is light source 375. In one embodiment, light source 375 is a single light source, while in alternative embodiments, light source 375 includes a plurality of sources of light, with one source of light corresponding to each light source channel. Control block 305 is coupled to each of bank 315, bank 335 and light source 375, and may be coupled to each of light source channels 360, 365 and 370 in some embodiments.

Waveguide 310 is made of a first material. In some embodiments, bank 315 and bank 335 includes optical channels made of a second material different from the first material. In alternate embodiments, bank 315 is made of a second material and bank 335 is made of a third material.

Furthermore, note that in some embodiments, the materials of bank 315 and bank 335 are configurable, allowing for control of transmission of light through the optical channels of the banks 315 and 335. Such control may allow for transmission of a data light bullet and absorption or disposal of a guiding light bullet, based on control signals provided by control block 305. For example, an optical channel of bank 335 may be controlled through an electrical signal, changing a bias voltage across the optical channel, and thereby altering its physical properties. In some embodiments, control block 305 controls light source 375, and may control power/intensity level, whether light bullets are generated, and/or which light source channels transmit light bullets for example.

Figure 4:
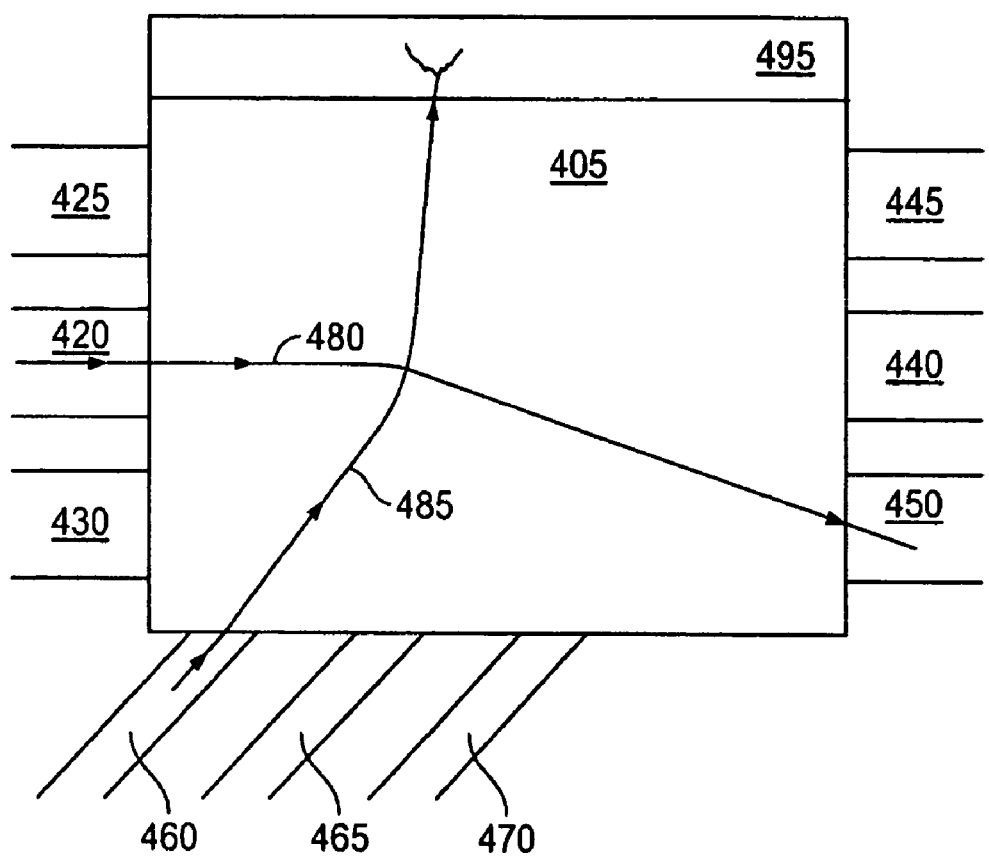
FIG. 4 illustrates another alternate embodiment of an optical switch.

In some embodiments, it may be useful to absorb guide light bullets after interaction with data light bullets. FIG. 4 illustrates another alternate embodiment of an optical switch. The embodiment illustrated makes use of an absorption layer connected to the waveguide in an area where guide bullets may effectively be aimed without interfering with placement of channels for data or light source channels. Waveguide 410 is formed of a first material, such as GaAs for example. Extending from waveguide 410 on a first side are channels 420, 425 and 430, each of which provide a path for a light bullet. Extending from a second side of waveguide 410 are channels 440, 445 and 450. The channels 420, 425, 430, 440, 445, and 450 are formed of a different material from the first material. In some embodiments, all channels are formed of the same material. In alternate embodiments, individual channels may be formed of various different materials. Extending from a third side of waveguide 410 are light source channels 460, 465 and 470. Extending from a fourth side of waveguide 410 is absorption layer 495, which is to absorb light bullets and thereby remove potentially uncontrolled light bullets.

As illustrated, light bullet 480 is inserted into waveguide 410 from channel 420 on a path aimed at channel 440. However, a guide light bullet 485 (a light bullet intended to guide another light bullet) is inserted into waveguide 410 from light source channel 460. Within waveguide 410, light bullet 480 and light bullet 485 interact in a predetermined manner, causing light bullet 480 to deviate to channel 450 and causing light bullet 285 to deviate to absorption layer 495. Effectively, light bullet 480 has been switched from channel 440 to channel 450 (or from channel 420 to channel 450), and light bullet 485 has been absorbed after causing the switch. Note that light bullets 480 and 485 co-propogate and have an attractive effect on each other. Note also that light bullet 485 is effectively aimed by assuming the illustrated interaction. Light bullet 485 may be aimed such that any expected interaction or lack thereof will result in absorption.

Figure 5:
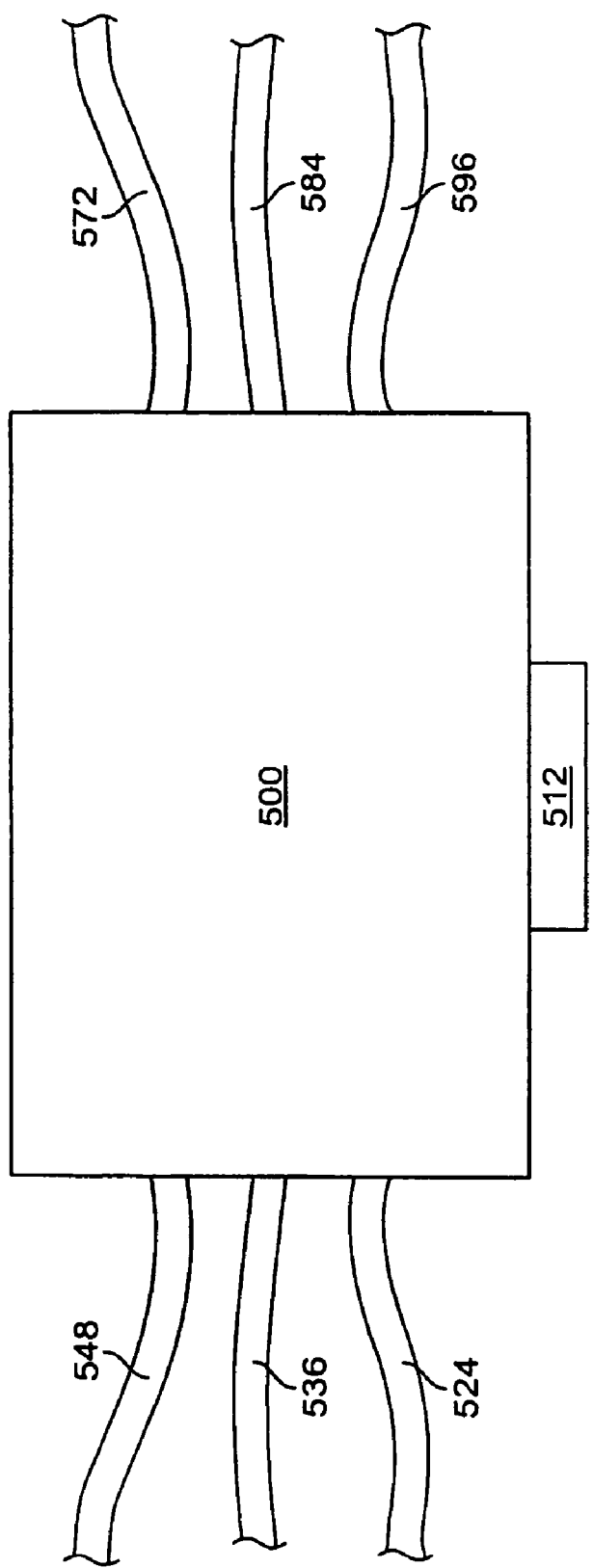
FIG. 5 illustrates an embodiment of a component including an optical switch.

The various embodiments illustrated to this point may be used within larger systems for switching of data between various transmission paths. FIG. 5 illustrates an embodiment of a component including an optical switch. For various embodiments, the component may be expected to include an interface for data and a system or control interface. Box 500 embodies the optical switch. Connected to box 500 are cables 524, 536, 548, 572, 584 and 596, each of which is a fiber optic or similar cable suitable for transmission of optical signals. Box 500 also includes interface 512, which may be used for coupling to a system that controls the operation of box 500.

Box 500 itself may be expected to include a waveguide, three sets of channels, a light source, and potentially a control module. The first set of channels may be connected between the waveguide and cables 524, 536 and 548. The second set of channels may be connected between the waveguide and cables 572, 584 and 596. The third set of channels may be connected between the waveguide and the light source. The control module may be connected to or coupled to one or more of these components within box 500 for the purpose of controlling operation of the switch, and may also be coupled to interface 512 for the purpose of communicating with an external system. Thus, the contents of box 500 may be similar to the components illustrated in FIGS. 2 and 3 for example.

Figure 6:
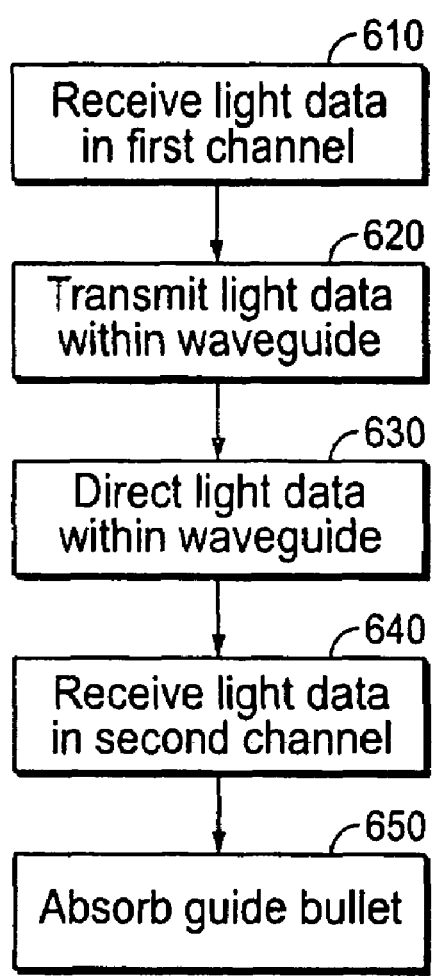
FIG. 6 illustrates an embodiment of a method of switching data optically.

The various embodiments illustrated thus far may be expected to implement methods of switching data optically, and other embodiments may be expected to implement similar methods. FIG. 6 illustrates an embodiment of a method of switching data optically. The method, in various embodiments, may be expected to receive data as light bullets, steer the light bullets, and transmit light bullets to a predetermined location. At block 610, light data is received as a light bullet in a first channel. At block 620 the light data is transmitted or injected into a wave guide connected to the first channel. At block 630, the light data in the form of a light bullet is directed within the waveguide through its interaction with a guiding light bullet. At block 640, the light data is received from the waveguide in a second channel connected to the waveguide. At block 650, the guiding light bullet used to direct the light data is absorbed.

Figure 7:
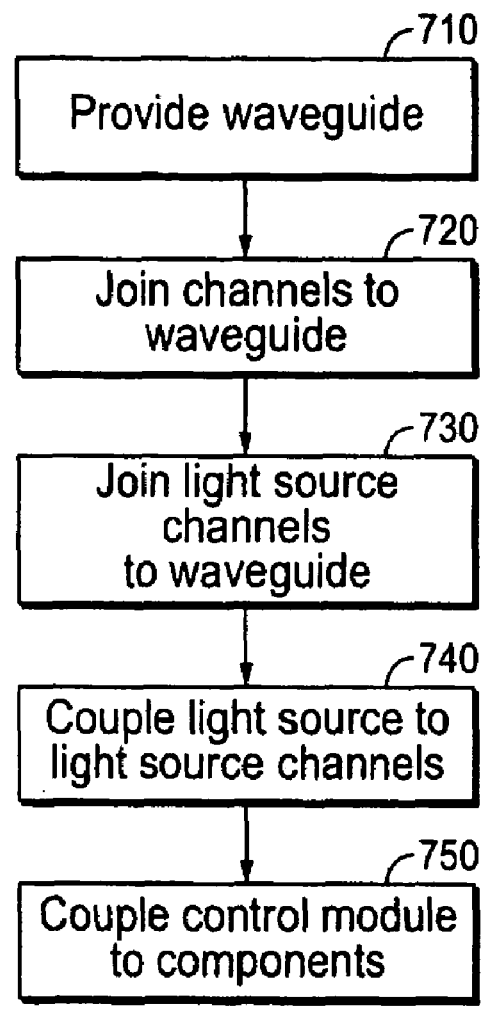
FIG. 7 illustrates an embodiment of a method of constructing an optical switch.

The optical switches illustrated thus far may generally be constructed using available components and a straightforward process. FIG. 7 illustrates an embodiment of a method of constructing an optical switch. The general process, in various embodiments, may be expected to involve using standard or available (rather than custom-made) components for a waveguide, channels, light source channels, and light source(s). At block 710, a waveguide of a first material is provided. At block 720, a plurality of channels formed of a material other than the first material are joined to the waveguide to provide optical paths for light bullets. At block 730, a plurality of light source channels are joined to the waveguide to provide optical paths for guiding light bullets. At block 740, a light source is coupled to the light source channels. The light source may be a single source of light or an array of sources of light for example. At block 750, a control block is coupled to the light source, and optionally to the light source channels and/or the plurality of channels. The control module may implement various control functions, such as operating a single source of light of an array of sources, or selectively changing the transmission characteristics of various channels or light source channels. Additionally, in some embodiments, an absorption layer may be added to the waveguide, such as on a side which will not be connected to channels or light source channels for example.

Figure 8:
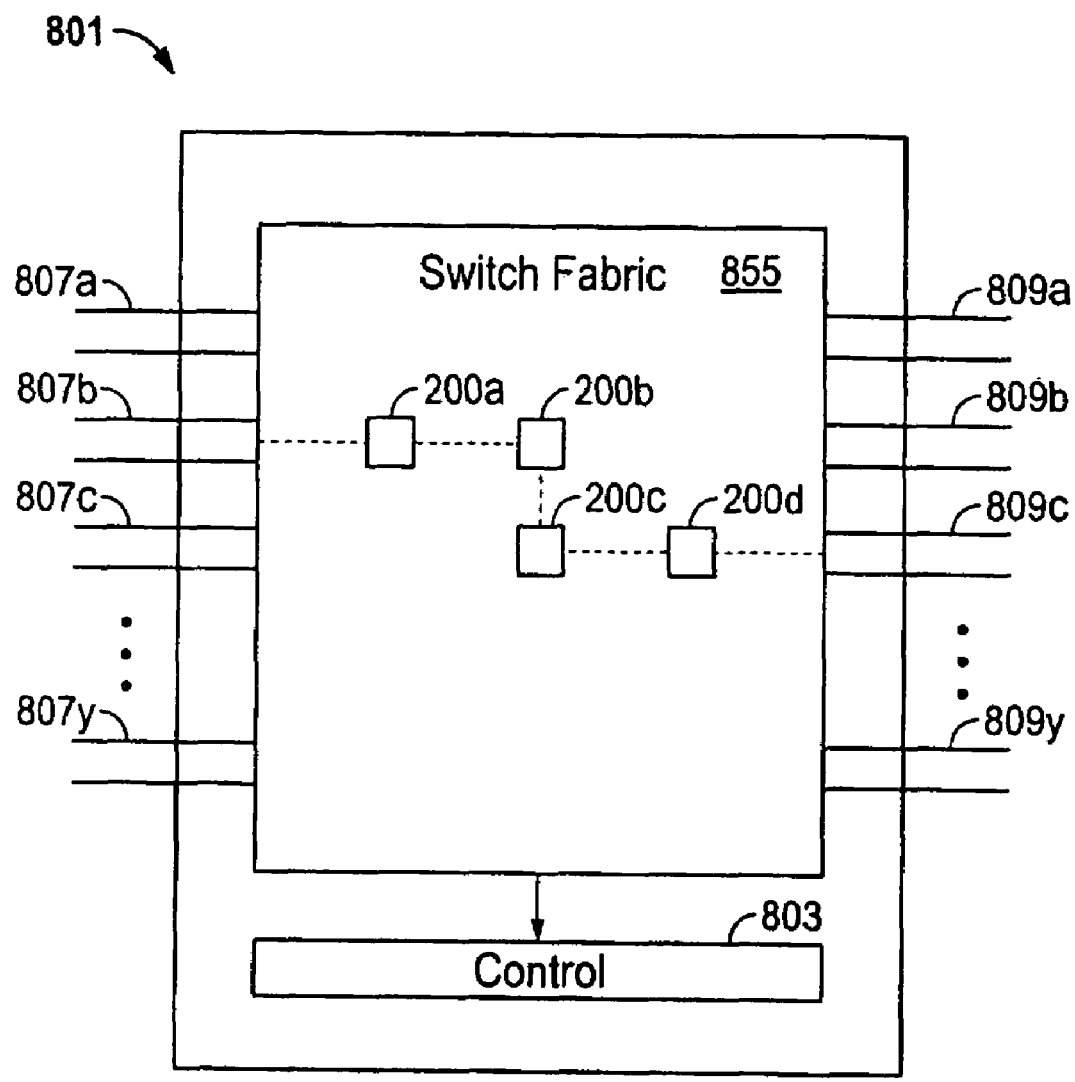
FIG. 8 illustrates an embodiment of a router including embodiments of optical switches.

In some embodiments, a router or a switching fabric useful in components such as a router may be implemented. FIG. 8 illustrates an embodiment of a router including embodiments of optical switches. Router 801 includes input ports 807 (807*a*, 807*b*, 807*c* . . . 807*x*), control module 803, output ports (809*a*, 809*b*, 809*c*, . . . 809*y*) and switching fabric 855. Input ports 807 may be implemented in various manners, including as simple conduits from an outside source (such as a fiber optic cable for example) to switching fabric 855, or as more complex modules including status memory/indicators and potentially some form of buffer. Coupled to each of input ports 807 is switching fabric 855, which is also coupled to each of output ports 809. Output ports 809 may similarly be implemented in various manners, including as simple conduits from switching fabric 855 to an outside source (such as a fiber optic cable for example), or as more complex modules including status indicators/memory and potentially some form of buffer.

Switching fabric 855 is implemented using embodiments of optical switches, such as switch 200 of FIG. 2. As illustrated, connectivity is achieved between switches 200*a*, 200*b*, 200*c* and 200*d*. Extension of this connectivity to a sufficient set of switches 200 allows for full connectivity between each of input ports 807 and each of output ports 809. In alternate embodiments, various types of optical switches may be used to implement switching fabric 855. In one embodiment, control module 803 controls the operations of switching fabric 855, determining which switches 200 are active and thereby determining the paths of data through switching fabric 855. In some embodiments, control module 803 may be coupled to input ports 807 or output ports 809 (or both) for the purpose of receiving status information and potentially for control of associated buffers.

From the foregoing, it will be appreciated that specific embodiments of the invention have been described herein for purposes of illustration, but that various modifications may be made without deviating from the spirit and scope of the invention. In some instances, reference has been made to characteristics likely to be present in various or some embodiments, but these characteristics are also not necessarily limiting on the spirit and scope of the invention. In the illustrations and description, structures have been provided which may be formed or assembled in other ways within the spirit and scope of the invention. Similarly, methods have been illustrated and described as linear processes, but such methods may have operations reordered or implemented in parallel within the spirit and scope of the invention. Accordingly, the invention is not limited except as by the appended claims.

I claim:

1. A multi-channel, optical switch to use light bullets as optical pulses, the switch comprising:

a waveguide of a first material;

a plurality of channels extending from the waveguide, each channel of the plurality of channels to provide an optical path suitable for transmission of the light bullets, each channel formed of a material other than the first material;

wherein a first subset of the light bullets are to propagate into a predetermined channel of the plurality of channels responsive to interaction with a second subset of the light bullets;

a plurality of light source channels extending from the waveguide, each light source channel to provide an optical path suitable for transmission of light bullets; and a light source connected to the plurality of light source channels, the light source to provide the second subset of light bullets, and wherein the light source includes multiple sources of light, and one source of light is provided for each light source channel of the plurality of light source channels.

2. The switch of claim 1, wherein:
the light bullets are to co-propagate through and interact within the waveguide to selectively direct the light bullets.

3. The switch of claim 1, further comprising:
an absorption layer extending from the waveguide, the absorption layer to absorb light bullets.

4. The switch of claim 1, further comprising:
a controller coupled to the waveguide and coupled to the plurality of channels, the controller to control operation of the waveguide and the plurality of channels.

5. The switch of claim 4, wherein:
the channels of the plurality of channels may be selectively disabled from transmitting light bullets; and
the controller to selectively disable the channels of the plurality of channels on an individual or group basis.

6. The switch of claim 5, further comprising:
a plurality of light source channels extending from the waveguide, each light source channel to provide an optical path suitable for transmission of light bullets; and
a light source coupled to the plurality of light source channels, the light source to provide the second subset of light bullets, the light source coupled to the controller.

7. The switch of claim 6, wherein:
the controller is to control the light source, the controller to set a power level of the light source, the power level of the light source corresponding to an intensity of the light bullets produced by the light source.

8. The switch of claim 1, wherein:
the first material is a semiconductor material.

9. The switch of claim 1, wherein:
the first material is bulk material to provide the light bullets with other directions of propagation, including directions of propagation out of the plane of the waveguide.

10. The switch of claim 1, wherein:
the light bullets propagate along corresponding travel paths; and
the travel paths are selectively determined by controlling the timing, intensity, and the axial displacement of the light bullets relative to each other.

11. A method of switching optical data comprising:
receiving a light bullet in a first optical channel, the first optical channel formed of a first material;
injecting the light bullet into a waveguide, the waveguide formed of a second material different from the first material;
generating a guiding light bullet from one of a plurality of light sources;
injecting the guiding bullet into the waveguide
directing the light bullet within the waveguide responsive to the guiding light bullet provided from one of a plurality of light sources; and
receiving the light bullet in a predetermined second optical channel.

* * * * *